US010993076B2

(12) United States Patent
Sakurai et al.

(10) Patent No.: US 10,993,076 B2
(45) Date of Patent: Apr. 27, 2021

(54) LIGHTING CONTROL APPARATUS AND LIGHTING CONTROL METHOD

(71) Applicant: HONDA MOTOR CO., LTD., Tokyo (JP)

(72) Inventors: Kenya Sakurai, Wako (JP); Ryo Morosawa, Wako (JP); Haisong Liu, Wako (JP); Katsuyasu Yamane, Wako (JP); Tomoya Nishino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/814,092

(22) Filed: Mar. 10, 2020

(65) Prior Publication Data

US 2020/0304943 A1 Sep. 24, 2020

(30) Foreign Application Priority Data

Mar. 18, 2019 (JP) .............................. JP2019-050323

(51) Int. Cl.
| | | |
|---|---|---|
| H04W 24/00 | (2009.01) |
| G06Q 50/00 | (2012.01) |
| G05B 19/00 | (2006.01) |
| H04W 4/02 | (2018.01) |
| H05B 47/19 | (2020.01) |
| B60Q 3/80 | (2017.01) |
| B60R 25/24 | (2013.01) |
| B60Q 1/50 | (2006.01) |
| H04W 4/40 | (2018.01) |

(52) U.S. Cl.
CPC .............. *H04W 4/023* (2013.01); *B60Q 1/50* (2013.01); *B60Q 3/80* (2017.02); *B60R 25/24* (2013.01); *H05B 47/19* (2020.01); *B60Q 2900/30* (2013.01); *B60R 2325/205* (2013.01); *H04W 4/40* (2018.02)

(58) Field of Classification Search
CPC ........ H04W 4/023; H04W 4/40; H05B 47/19; B60Q 1/50; B60Q 3/80; B60Q 2900/30; B60R 25/24; B60R 2325/205
USPC ........................................................ 455/456.1
See application file for complete search history.

(56) References Cited

U.S. PATENT DOCUMENTS

| | | | | |
|---|---|---|---|---|
| 4,041,301 A * | 8/1977 | Pelchat | .................. | B60Q 1/323 362/100 |
| 2001/0005170 A1* | 6/2001 | Heide | .................. | G06K 7/0008 340/5.61 |
| 2003/0002179 A1* | 1/2003 | Roberts | ................. | G02F 1/1533 359/838 |
| 2006/0235753 A1* | 10/2006 | Kameyama | ............ | B60Q 1/143 705/15 |
| 2014/0218521 A1* | 8/2014 | Tanaka | ..................... | B60Q 1/24 348/148 |
| 2014/0266669 A1* | 9/2014 | Fadell | ................. | H04L 12/2803 340/501 |
| 2019/0327576 A1* | 10/2019 | Nehmad | .................. | H04W 4/02 |

FOREIGN PATENT DOCUMENTS

JP 2009-179998 8/2009

* cited by examiner

*Primary Examiner* — Mark G. Pannell
(74) *Attorney, Agent, or Firm* — Rankin, Hill & Clark LLP

(57) ABSTRACT

A vehicle control apparatus includes: a distance acquiring unit that acquires a distance between the vehicle and a mobile terminal having an unlocking function of the vehicle; and a lighting control unit that controls lit states of room lights and under lights that are provided to the vehicle.

5 Claims, 5 Drawing Sheets

LIGHTING CONTROL APPARATUS AND LIGHTING CONTROL METHOD

INCORPORATION BY REFERENCE

The present application claims priority under 35 U.S.C. § 119 to Japanese Patent Application No. 2019-050323 filed on Mar. 18, 2019. The content of the applications is incorporated herein by reference in its entirety.

BACKGROUND OF THE INVENTION

Field of the Invention

The present invention relates to a lighting control apparatus and a lighting control method.

Description of the Related Art

Conventionally, there is known a technique for turning on a lighting unit provided in a mobile body (for example, see Japanese Patent Laid-Open No. 2009-179998). Japanese Patent Laid-Open No. 2009-179998 discloses an in-vehicle device control system that changes irradiation angles of lighting provided on door mirrors depending on the distance between a vehicle as a mobile body and a mobile device so as to illuminate the range of the ground corresponding to the distance between the vehicle and the mobile device.

However, Japanese Patent Laid-Open No. 2009-179998 is designed on an assumption that there is one kind of lighting that is turned on depending on the distance between the vehicle and the mobile device, and there is no consideration on controlling the lit states of a plurality of kinds of lighting depending on the distance. Therefore, with Japanese Patent Laid-Open No. 2009-179998, while a user can check the road condition in the surrounding of the vehicle with the lighting when using the vehicle, the user may not be able to check other conditions such as the condition inside the vehicle, for example.

The present invention is designed in view of the aforementioned circumstance, and it is an object of the present invention to enable the user to check various kinds of conditions regarding the mobile body when using the mobile body.

SUMMARY OF THE INVENTION

An aspect of the present invention is a lighting control apparatus that includes: a distance acquiring unit that acquires a distance between a mobile body and a communication terminal giving an instruction to unlock the mobile body; and a lighting control unit that controls lit states of a first lighting unit and a second lighting unit that are provided to the mobile body according to the distance acquired by the distance acquiring unit.

According to another aspect of the present invention, the lighting control unit turns on the first lighting unit when the distance acquired by the distance acquiring unit is a first distance, and turns on the second lighting unit when the distance acquired by the distance acquiring unit is a second distance that is shorter than the first distance.

According to another aspect of the present invention, the first lighting unit illuminates an inside of the mobile body by being lit on; and the second lighting unit illuminates an outside of the mobile body by being lit on.

According to another aspect of the present invention, when the distance acquired by the distance acquiring unit is a third distance that is shorter than the second distance, the lighting control unit turns on a third lighting unit that guides a position of a receiving unit for receiving an unlocking operation of the mobile body by being lit on.

According to another aspect of the present invention, the second lighting unit illuminates a position where a passenger of the mobile body gets in and out the mobile body.

According to another aspect of the present invention, when the distance acquired by the distance acquiring unit is a fourth distance that is longer than the first distance, the lighting control unit turns on a fourth lighting unit that illuminates the outside of the mobile body.

Another aspect of the present invention is a lighting control method of a lighting control apparatus that controls lit states of a first lighting unit and a second lighting unit that are provided to a mobile body, and the method includes, by the lighting control apparatus: acquiring a distance between the mobile body and a communication terminal giving an instruction to unlock the mobile body; and controlling the lit states of the first lighting unit and the second lighting unit according to the acquired distance.

According to the aspects of the present invention, the user can check various kinds of conditions regarding the mobile body to be used when using the mobile body.

DETAILED DESCRIPTION OF THE PREFERRED EMBODIMENTS

Hereinafter, embodiments of the present invention will be described by referring to the accompanying drawings.

1. First Embodiment

[1-1. Configuration of Vehicle Control System]

Figure 1:
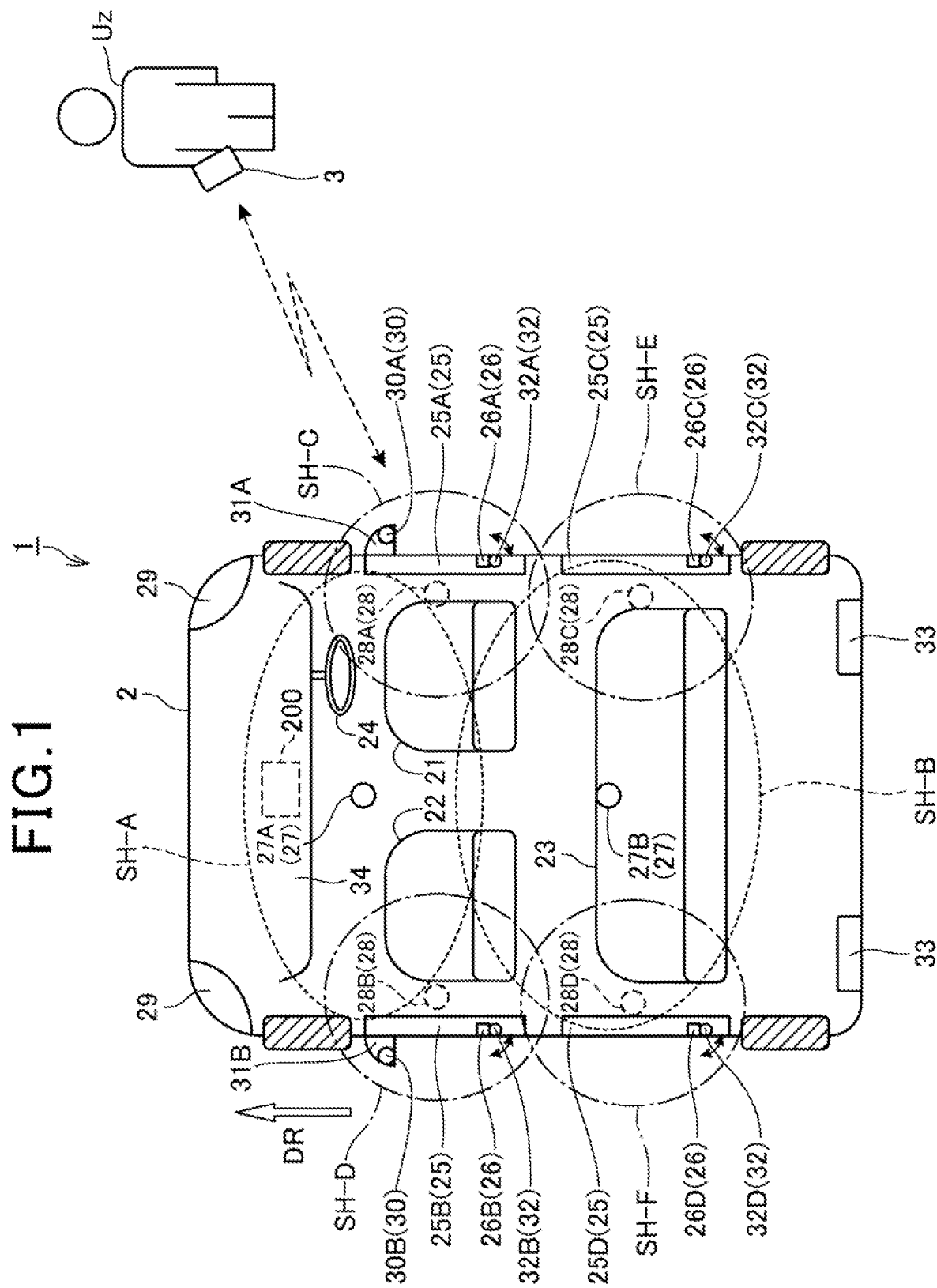
FIG. 1 is a diagram showing a configuration of a vehicle control system according to a first embodiment.

FIG. 1 is a diagram showing a configuration of a vehicle control system 1 according to the first embodiment.

The vehicle control system 1 according to the embodiment includes a vehicle 2 and a mobile terminal 3 that functions as an electronic key of the vehicle 2. The vehicle 2 is an example of the mobile body of the present invention. The mobile terminal 3 is an example of the communication terminal of the present invention. The vehicle control system 1 of the embodiment includes a function of giving an instruction for locking or unlocking doors 25 of the vehicle 2 by having wireless communication between the mobile terminal 3 and the vehicle 2. In addition to such function, the vehicle control system 1 may also have other functions such as starting or stopping a drive source of the vehicle 2 by having wireless communication between the mobile terminal 3 and the vehicle 2, for example.

The mobile terminal 3 is a mobile apparatus that can be carried by an operator Uz. The operator Uz is a user of the vehicle 2, such as a driver of the vehicle 2 or a passenger or the like other than the driver. The mobile terminal 3 has an unlocking instruction function related to unlocking the vehicle 2. The unlocking function of the mobile terminal 3 includes a function of responding to a signal transmitted from the vehicle 2 and a function of transmitting identification information SJ-3 allotted in advance for the use of the vehicle 2 to the vehicle 2 along with the response. The mobile terminal 3 may be an apparatus dedicatedly used for executing the unlocking function or may be an external information communication terminal such as a smartphone or a tablet terminal to which an application program having the unlocking function is installed.

The vehicle 2 is a four-wheeled passenger car as shown in FIG. 1. In FIG. 1, the traveling direction when the gear is shifted to drive and the vehicle 2 runs is indicated by a reference sign DR, the traveling direction DR is defined as the front side of the vehicle 2, the reverse direction of the traveling direction DR is defined as the rear side of the vehicle 2, the right direction with respect to the traveling direction DR is defined as the right side of the vehicle 2, and the left direction with respect to the traveling direction DR is defined as the left side of the vehicle 2 in the following explanation.

In a car cabin 2A that is the inside of the vehicle 2, seats 21, 22, and a rear seat 23 are provided. The seat 21 is the seat corresponding to a position where a steering wheel 24 is placed, which is the so-called a driver's seat. The seat 22 is the so-called the passenger seat.

The vehicle 2 has four doors 25 that are doors 25A, 25B, 25C, and 25D. The door 25A is the door of the driver's seat, the door 25B is the door of the passenger seat, and the doors 25C and 25D are the doors of the rear seat. Each of the doors 25A, 25B, 25C, and 25D is provided with a door lock sensor 26. The door lock sensor 26 is configured with a mechanical switch, a touch sensor, or the like, for example, and outputs an unlocking signal indicating unlocking of the door or a locking signal indicating locking to a vehicle control apparatus 200 in response to an operation of the operator Uz. The vehicle control apparatus 200 corresponds to an example of the lighting control apparatus. The door lock sensor 26 is an example of the receiving unit of the present invention. The door lock sensor 26 is provided at a prescribed position of a door outer handle or a door outer body, for example.

On a ceiling of the vehicle 2, there are two room lights 27 placed in line in the front and rear direction with a space provided therebetween. The room lights 27 are an example of the first lighting unit of the present invention. The front-side room light 27A is provided on the ceiling of the vehicle 2 in a mode to illuminate the front side of the car cabin 2A as shown as a lighting range SH-A of the room light 27A. Note that the lighting range SH-A of the room light 27A shown in FIG. 1 is simply an example, and the range is not to be limited thereto. For example, the lighting range SH-A may be a wider range that illuminates the whole seats 21 and 22, for example, or may be a narrower range than the range shown in FIG. 1. Further, the room light 27A may be provided not only on the ceiling but also under the feet and side faces on the inner side of the vehicle 2. The rear-side room light 27B is provided on the ceiling of the vehicle 2 in a mode to illuminate the rear side of the car cabin 2A as shown as a lighting range SH-B of the room light 27B. Like the lighting range SH-A, the lighting range SH-B of the room light 27B shown in FIG. 1 is simply an example, and the range is not limited thereto.

There may not be two room lights 27 provided to the vehicle 2 but may be one room light 27, and there is no limit set for the positional relation when a plurality of room lights 27 are provided. For example, the room lights 27 may be disposed on left and right, or may be provided on the ceiling above each of the seats 21, 22, 23, under the feet thereof, and in the vicinity thereof.

On the bottom part of the car body of the vehicle 2, there are four under lights 28 that are the under lights 28A, 28B, 28C, and 28D. The under lights 28 are the lights illuminating the ground in the vicinity of the doors 25 as the outside of the vehicle 2. The under lights 28 are an example of the second lighting unit of the present invention. The under light 28A is provided on the bottom part of the car body of the vehicle 2 in a mode to include the ground in the vicinity of the door 25A within a lighting range SH-C of the under light 28A. Further, the under light 28B is provided on the bottom part of the car body of the vehicle 2 in a mode to include the ground in the vicinity of the door 25B within a lighting range SH-D of the under light 28B. Further, the under light 28C is provided on the bottom part of the car body of the vehicle 2 in a mode to include the ground in the vicinity of the door 25C within a lighting range SH-E of the under light 28C. Further, the under light 28D is provided on the bottom part of the car body of the vehicle 2 in a mode to include the ground in the vicinity of the door 25D within a lighting range SH-F of the under light 28D. Note that the vicinity of the doors 25 means the range that includes the positions where the passengers of the vehicle 2 get in and out the vehicle 2. Further, the under lights are for illuminating the range including the positions for getting in and out of the vehicle, and there is no limit set for where to place the under lights whether it is inside or outside the vehicle 2. When the under lights 28 are set inside the vehicle 2, the lighting range SH-F is formed outside the vehicle by using a transparent light guiding member.

There may not be limited to four under lights 28 provided to the vehicle 2 but more under lights 28 may be provided as well.

In addition to the two room lights 27 and the four under lights 28, there are following lights provided to the vehicle 2.

That is, headlights 29 are provided to the vehicle 2. The headlights 29 correspond to an example of the fourth lighting unit of the present invention.

Further, two side-view mirror lights 30 are provided to the vehicle 2. The side-view mirror light 30A is the light provided to a right side-view mirror 31A of the vehicle 2. The side-view mirror light 30B is the light provided to a left side-view mirror 31B of the vehicle 2. Note that the side-view mirror lights 30 correspond to an example of the fourth lighting unit of the present invention.

Further, there are four guide lights 32 that are the guide lights 32A, 32B, 32C, and 32D provided to the vehicle 2. The guide lights 32A, 32B, 32C, and 32D are provided to the doors 25A, 25B, 25C, and 25D, respectively. Each of the guide lights 32 is disposed in the vicinity of the door lock sensor provided to the corresponding door 25 and turned on to guide the position of the door lock sensor 26 in the corresponding door 25 to the operator Uz on the outside of the vehicle 2. Note that the guide lights 32 correspond to an example of the third lighting unit of the present invention.

Further, there are taillights 33 provided to the vehicle 2. The taillights 33 correspond to an example of the fourth lighting unit of the present invention.

In the car cabin 2A, a front panel 34 is disposed. The front panel 34 is an interior member of the car cabin 2A fixed to the vehicle 2, and includes a dashboard, an instrument panel, a center console, a frame, not shown, for supporting those components, and the like. The vehicle control apparatus 200 is embedded in the front panel 34.

[1-2. Configurations of Vehicle and Mobile Terminal]

Figure 2:
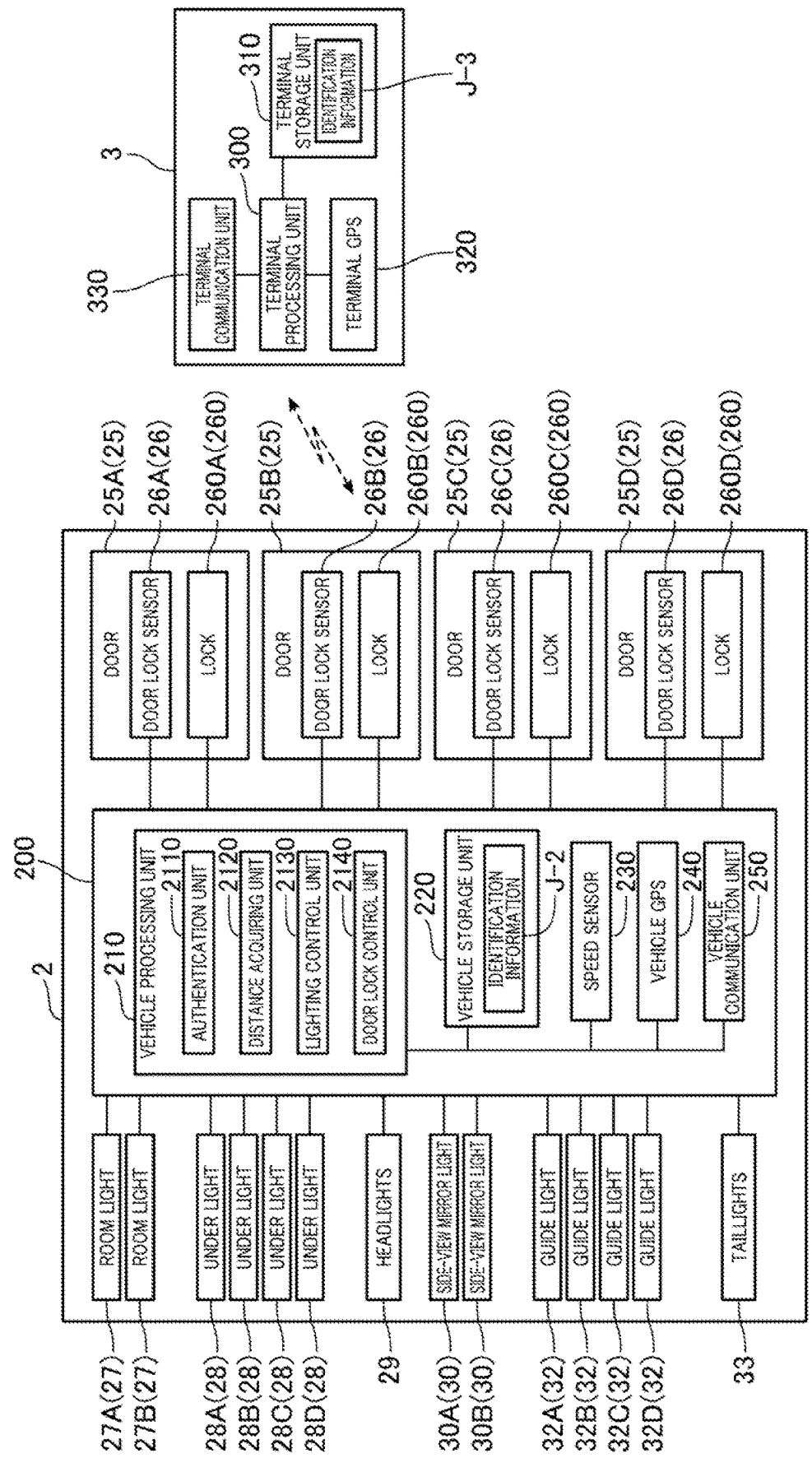
FIG. 2 is a block diagram showing a vehicle and a mobile terminal.

FIG. 2 is a block diagram showing configurations of the vehicle 2 and the mobile terminal 3.

First, the mobile terminal 3 will be described.

The mobile terminal 3 includes a terminal processing unit 300, a terminal storage unit 310, a terminal GPS 320, and a terminal communication unit 330 (terminal receiver/transmitter).

The terminal processing unit 300 is a computer that includes a processor such as a CPU (Central Processing Unit), for example. The terminal storage unit 310 is connected to the terminal processing unit 300. The terminal storage unit 310 stores a control program that is a computer program executed by the terminal processing unit 300 and various kinds of data processed by the terminal processing unit 300 in a manner to be readable by the terminal processing unit 300. Further, the terminal storage unit 310 stores identification information J-3.

There is no specific limit set for the mode of hardware configuring the terminal processing unit 300 and the terminal storage unit 310. For example, the terminal processing unit 300 may be configured with a single processor. Further, the terminal processing unit 300 may be an integrated device configured with a processor, a ROM (Read Only Memory), a RAM (Random Access Memory), and the like. The terminal storage unit 310 may be configured with a nonvolatile memory that stores programs and data in a nonvolatile manner and, specifically, may include a magnetic storage device such as a hard disc and a semiconductor memory device such as a flash ROM. Further, the terminal storage unit 310 may include a volatile memory that temporarily stores programs, data, and the like to be executed by the terminal processing unit 300. Furthermore, the terminal processing unit 300 and the terminal storage unit 310 may also be an integrated single device.

The terminal processing unit 300 controls each unit of the mobile terminal 3 based on the data stored in the terminal storage unit 310 by executing the programs stored in the terminal storage unit 310.

The terminal GPS (Global Positioning System) 320 is a processing unit that receives GPS signals from a GPS satellite via an antenna, not shown, and calculates the position of the mobile terminal 3 based on the received GPS signals. The terminal GPS 320 generates terminal position data indicating the position of the mobile terminal 3 and outputs to the terminal processing unit 300.

The terminal communication unit 330 wirelessly communicates with external devices by executing wireless communication conforming to a communication standard such as a mobile phone network, Wi-Fi®, or Bluetooth® according to the control of the terminal processing unit 300. The terminal communication unit 330 of the embodiment receives a request signal with an LF signal from the vehicle 2. The request signal will be described later. Further, the terminal communication unit 330 of the embodiment transmits a response signal with an RF signal to the vehicle 2 as a response to the received request signal. The response signal includes data corresponding to the kind of the request signal.

Next, the vehicle 2 will be described.

The vehicle 2 includes the vehicle control apparatus 200. The vehicle control apparatus 200 includes a vehicle processing unit 210, a vehicle storage unit 220, a speed sensor 230, a vehicle GPS 240, and a vehicle communication unit 250 (vehicle receiver/transmitter).

The two room lights 27, the four under lights 28, the headlights 29, the two side-view mirror lights 30, the four guide lights 32, and the taillights 33 are connected to the vehicle control apparatus 200. Further, the door lock sensor 26A as well as a lock 260A provided to the door 25A, the door lock sensor 26B as well as a lock 260B provided to the door 25B, the door lock sensor 26C as well as a lock 260C provided to the door 25C, and the door lock sensor 26D as well as a lock 260D provided to the door 25D are connected to the vehicle control apparatus 200. Each of the locks 260A, 260B, 260C, and 260D is configured with a door lock mechanism that unlocks and locks the door, and a door lock motor that drives the door lock mechanism, for example.

Each of those units may be connected to a circuit board housed in the vehicle control apparatus 200 by using a connector or the like. Further, the vehicle control apparatus 200 may be configured by connecting each unit via a communication network conforming to a CAN (Control Area Network). Further, it is also possible to employ a configuration in which another apparatus such as an ECU (Electronic Control Unit), not shown, loaded on the vehicle 2 is connected to each unit configuring the vehicle control apparatus 200 via a common communication network.

The vehicle processing unit 210 is a computer that includes a processor such as a CPU, for example. The vehicle storage unit 220 is connected to the vehicle processing unit 210. The vehicle storage unit 220 stores a control program that is a computer program executed by the vehicle processing unit 210 and various kinds of data processed by the vehicle processing unit 210 in a manner to be readable by the vehicle processing unit 210. Further, the vehicle storage unit 220 stores identification information J-2 allotted in advance for the use of the vehicle 2 by the operator Uz.

Like the case of the terminal processing unit 300 and the terminal storage unit 310, there is no specific limit set for the mode of hardware configuring the vehicle processing unit 210 and the vehicle storage unit 220.

The vehicle processing unit 210 includes an authentication unit 2110, a distance acquiring unit 2120, a lighting control unit 2130, and a door lock control unit 2140 as functional elements or functional units. Those functional elements provided to the vehicle processing unit 210 are achieved by executing the control program stored in the vehicle storage unit 220 by the vehicle processing unit 210 that is the computer.

Note that the control program to be executed by the vehicle processing unit 210 can be stored in any computer readable storage media. Instead, the whole or a part of the functional elements of the vehicle processing unit 210 can also be configured with hardware each including one or more electronic circuit component.

The vehicle processing unit 210 controls each unit of the vehicle control apparatus 200 according to the data stored in the vehicle storage unit 220 by executing the program stored in the vehicle storage unit 220. The vehicle processing unit 210 controls the speed sensor 230, the vehicle GPS 240, and the vehicle communication unit 250.

The speed sensor 230 is connected to the ECU or the like loaded on the vehicle 2, and acquires and analyzes speed pulse signals or speed data of the vehicle 2. The speed sensor 230 outputs the data indicating the speed of the vehicle 2 to the vehicle processing unit 210.

The vehicle GPS 240 is a processing unit that receives the GPS signals from the GPS satellite via the antenna, not shown, and calculates the absolute position of the vehicle 2 based on the received GPS signals. The vehicle GPS 240 generates vehicle position data indicating the position of the vehicle 2, and outputs to the vehicle processing unit 210.

The vehicle communication unit 250 wirelessly communicates with the devices other than the vehicle control apparatus 200 and the external devices and the like of the vehicle 2 by executing wireless communication conforming to the communication standard such as the mobile phone network, Wi-Fi, Bluetooth, or the like. The vehicle communication unit 250 of the embodiment transmits a request signal with an LF signal at prescribed intervals within a prescribed range of the surrounding of the vehicle 2. The request signal includes an identification information request signal and a distance request signal. The identification information request signal is the signal for requesting transmission of identification information J-3 stored in the mobile terminal 3. The distance request signal is the signal for requesting transmission of vehicle-terminal distance that shows the distance between the vehicle 2 and the mobile terminal 3. Further, the vehicle communication unit 250 of the embodiment receives a response signal with an RF signal as a response for the request signal from the mobile terminal 3 that has received the request signal.

The authentication unit 2110 is a functional unit that authenticates whether or not the operator Uz carrying the mobile terminal 3 is an authorized operator Uz who uses the vehicle 2. The authentication unit 2110 transmits an identification information request signal at prescribed intervals by using the vehicle communication unit 250. Upon receiving the identification information request signal, the mobile terminal 3 transmits a response signal including the identification information J-3 to the vehicle 2. When there is the response signal received by the vehicle communication unit 250 transmitted from the mobile terminal 3 in response to the transmitted identification information request signal, the authentication unit 2110 compares the identification information J-3 included in the received response signal with the identification information J-2 stored in the vehicle storage unit 220. Then, when the received identification information J-3 matches the identification information J-2 stored in the vehicle storage unit 220, the authentication unit 2110 determines that communication between the vehicle 2 and the mobile terminal 3 is being established and authenticates that the operator Uz who is carrying the mobile terminal 3 is the authorized operator Uz who uses the vehicle 2.

The distance acquiring unit 2120 is a functional unit that acquires, at prescribed intervals, the distance (hereinafter, referred to as "vehicle-terminal distance") between the mobile terminal 3 and the vehicle 2 which are determined to have established communication by the authentication unit 2110. The distance acquiring unit 2120 acquires the vehicle-terminal distance in a following manner, for example. The distance acquiring unit 2120 transmits the identification information J-2 stored in the vehicle storage unit 220 along with the distance request signal to the mobile terminal 3 via the vehicle communication unit 250. Upon receiving the distance request signal from the vehicle 2, the mobile terminal 3 calculates the vehicle-terminal distance based on the reception intensity of the distance request signal and transmits the data showing the calculated vehicle-terminal distance to the vehicle 2 as the response to the distance request signal. Thereby, the distance acquiring unit 2120 acquires the vehicle-terminal distance from the mobile terminal 3. Note that the vehicle-terminal distance acquiring method of the distance acquiring unit 2120 is not limited to the manner described above. For example, it is also possible to employ a method which acquires terminal position data calculated by the terminal GPS 320 from the mobile terminal 3, acquires vehicle position data calculated by the vehicle GPS 240, and calculates the vehicle-terminal distance based on the acquired position data.

The lighting control unit 2130 is a functional unit that controls the lit state of each of the two room lights 27, the four under lights 28, the headlights 29, the two side-view mirror lights 30, the four guide lights 32, and the taillights 33.

The door lock control unit 2140 starts detection of an unlocking operation or a locking operation done by the door lock sensor 26, when the authentication unit 2110 determines that communication with the mobile terminal 3 is established. When a signal outputted by the door lock sensor 26 is an unlocking signal, the door lock control unit 2140 controls the lock 260 of the door 25 where the door lock sensor 26 that has outputted the unlocking signal is provided to be in an unlocked state. Meanwhile, when a signal outputted by the door lock sensor 26 is a locking signal, the door lock control unit 2140 controls the lock 260 of the door 25 where the door lock sensor 26 that has outputted the locking signal is provided to be in a locked state.

[1-3. Actions of Vehicle Control Apparatus]

Next, actions of the vehicle control apparatus 200 according to the embodiment will be described.

Figure 3:
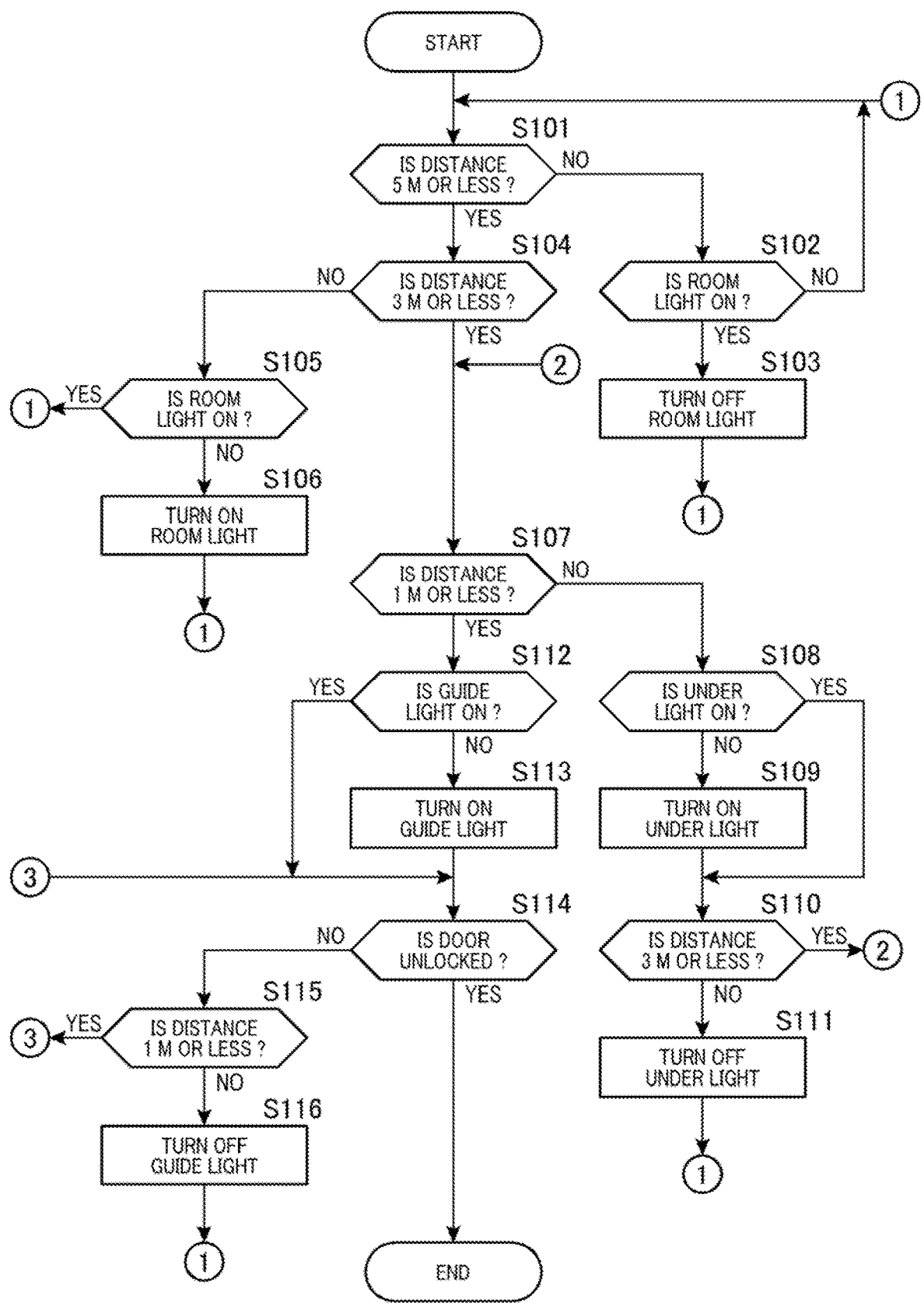
FIG. 3 is a flowchart showing actions of the vehicle control apparatus.

FIG. 3 is a flowchart showing the actions of the vehicle control apparatus 200.

In the actions shown in FIG. 3, it is assumed that communication between the vehicle 2 and the mobile terminal 3 is established. Therefore, in the actions of FIG. 3, it is assumed that the distance between the mobile terminal 3 and the vehicle 2 is equal to or less than a maximum communicable distance that is the maximum distance from the vehicle 2 within which the communication with the mobile terminal 3 can be established. Note that the maximum communicable distance is the distance longer than 5 m in the embodiment, and defined in advance appropriately by a test, a simulation, or the like conducted in advance. Further, in the actions of FIG. 3, it is assumed that the distance acquiring unit 2120 acquires the vehicle-terminal distance at prescribed intervals.

The lighting control unit 2130 determines whether or not the vehicle-terminal distance acquired by the distance acquiring unit 2120 is equal to or less than 5 m (step S101).

When the vehicle-terminal distance acquired by the distance acquiring unit 2120 is not equal to or less than 5 m, that is, when determined as longer than 5 m (NO in step S101), the lighting control unit 2130 determines whether or not the room lights 27 are in a lit-on state (step S102).

When determined as negative in step S102 (NO in step S102), the lighting control unit 2130 returns the processing to step S101. Meanwhile, when determined as positive in step S102 (YES in step S102), the lighting control unit 2130 turns off the room lights 27 (step S103) and returns the processing to step S101.

Returning to explanation of step S101, when determined as positive in step S101 (YES in step S101), the lighting control unit 2130 determines whether or not the vehicle-terminal distance acquired by the distance acquiring unit 2120 is equal to or less than 3 m (step S104).

When determined as negative in step S104 (NO in step S104), that is, the vehicle-terminal distance acquired by the distance acquiring unit 2120 is longer than 3 m (NO in step S104), the lighting control unit 2130 determines whether or not the room lights 27 are in a lit-on state (step S105).

When determined that the room lights are in a lit-on state (YES in step S105), the lighting control unit 2130 maintains the lit-on state and returns the processing to step S101. Meanwhile, when determined that the room lights 27 are not in a lit-on state, in other words, in a lit-off state (NO in step S105), the lighting control unit 2130 turns on at least one of the room lights 27A and 27B (step S106). Note that the lighting control unit 2130 may turn on all the room lights 27. Then, the lighting control unit 2130 returns the processing to step S101.

Returning to explanation of step S104, when determined as positive in step S104 (YES in step S104), the lighting control unit 2130 determines whether or not the vehicle-terminal distance acquired by the distance acquiring unit 2120 is equal to or less than 1 m (step S107).

When determined as negative in step S107 (NO in step S107), that is, the vehicle-terminal distance acquired by the distance acquiring unit 2120 is longer than 1 m (NO in step S107), the lighting control unit 2130 determines whether or not the under lights 28 are in a lit-on state (step S108).

When determined that the under lights 28 are in a lit-on state (YES in step S108), the lighting control unit 2130 maintains the lit-on state and executes the processing of step S110. Meanwhile, when determined that the under lights 28 are not in a lit-on state, in other words, in a lit-off state (NO in step S108), the lighting control unit 2130 turns on the under lights 28 (step S109). Then, the lighting control unit 2130 executes the processing of step S110. In step S109, the lighting control unit 2130 may be configured to turn on all the under lights 28 or may be configured to turn on the under light 28 corresponding to the direction where the operator Uz is positioned with respect to the vehicle 2. In the latter configuration, when the operator Uz is positioned on the right side of the vehicle 2, for example, the lighting control unit 2130 turns on the under lights 28A and 28C.

In step S110, the lighting control unit 2130 determines whether or not the vehicle-terminal distance acquired by the distance acquiring unit 2120 is equal to or less than 3 m (step S110).

When determined that the vehicle-terminal distance acquired by the distance acquiring unit 2120 is equal to or less than 3 m (YES in step S110), the lighting control unit 2130 returns the processing to step S107. Meanwhile, when determined that the vehicle-terminal distance acquired by the distance acquiring unit 2120 is longer than 3 m (NO in step S110), the lighting control unit 2130 turns off the under lights 28 (step S111) and returns the processing to step S101.

Returning to explanation of step S107, when determined that the vehicle-terminal distance acquired by the distance acquiring unit 2120 is equal to or less than 1 m (YES in step S107), the lighting control unit 2130 determines whether or not the guide lights 32 are in a lit-on state (step S112).

When determined that the guide lights 32 are in a lit-on state (YES in step S112), the lighting control unit 2130 maintains the lit-on state and executes the processing of step S114. Meanwhile, when determined that the guide lights 32 are not in a lit-on state, in other words, in a lit-off state (NO in step S112), the lighting control unit 2130 turns on the guide lights 32 (step S113). Then, the lighting control unit 2130 executes the processing of step S114. In step S113, the lighting control unit 2130 may be configured to turn on all the guide lights 32 or may be configured to turn on the guide light 32 corresponding to the direction where the operator Uz is positioned with respect to the vehicle 2. In the latter configuration, when the operator Uz is positioned on the right side of the vehicle 2, for example, the lighting control unit 2130 turns on the guide lights 32A and 32C.

In step S114, the lighting control unit 2130 determines whether or not the door lock control unit 2140 has unlocked at least one of the doors 25 (step S114).

When determined that the door lock control unit 2140 has unlocked at least one of the doors 25 (YES in step S114), the lighting control unit 2130 ends the processing.

Meanwhile, when determined that the door lock control unit 2140 has unlocked none of the doors 25 (NO in step S114), the lighting control unit 2130 determines whether or not the vehicle-terminal distance acquired by the distance acquiring unit 2120 is equal to or less than 1 m (step S115).

When determined that the vehicle-terminal distance acquired by the distance acquiring unit 2120 is equal to or less than 1 m (YES in step S115), the lighting control unit 2130 returns the processing to step S104. Meanwhile, when determined that the vehicle-terminal distance acquired by the distance acquiring unit 2120 is longer than 1 m (NO in step S115), the lighting control unit 2130 turns off all the guide lights 32 (step S116) and returns the processing to step S101.

Next, actions of the vehicle control apparatus 200 will be described by referring to a specific example.

Figure 4:
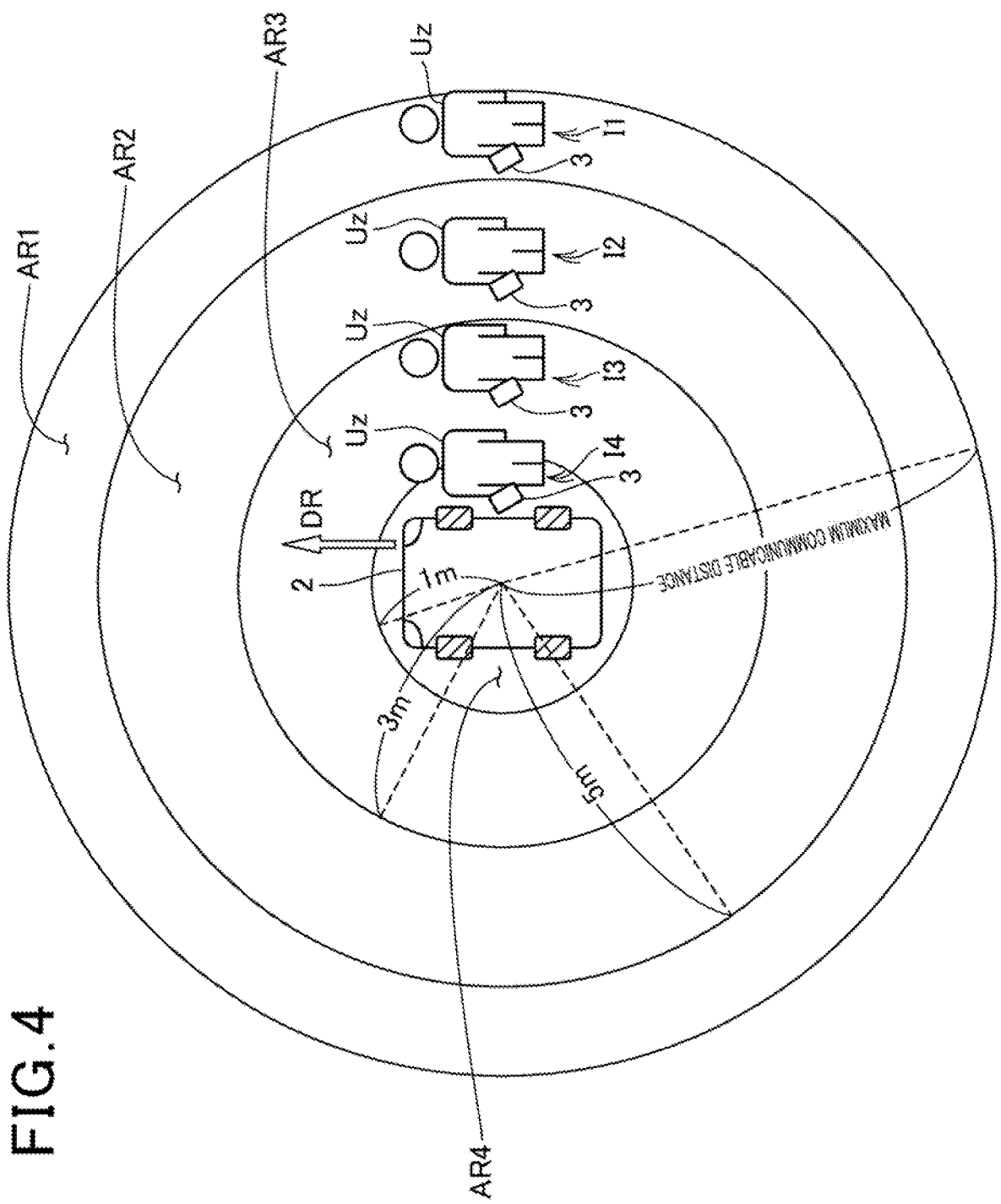
FIG. 4 is a diagram showing a specific example of the actions of the vehicle control apparatus.

FIG. 4 is a diagram showing the specific example of the actions of the vehicle control apparatus 200.

In FIG. 4, the traveling direction DR is defined as the front side of the vehicle 2, the reverse direction of the traveling direction DR is defined as the rear side of the vehicle 2, the right direction with respect to the traveling direction DR is defined as the right side of the vehicle 2, and the left direction with respect to the traveling direction DR is defined as the left side of the vehicle 2 as in the case of FIG. 1.

In FIG. 4, shown is a case where the operator Uz who carries the mobile terminal 3 approaches the vehicle 2 from the right side of the vehicle 2 and rides on the locked vehicle 2 in order to use the vehicle 2. Further, in the explanation using FIG. 4, it is assumed that the position of the operator Uz and the position of the mobile terminal 3 carried by the operator Uz are the same position. Furthermore, in the explanation using FIG. 4, it is assumed that communication between the vehicle 2 and the mobile terminal 3 is being established. That is, in the explanation using FIG. 4, it is assumed that the vehicle-terminal distance is equal to or less than the maximum communicable distance.

It is assumed that the operator Uz is at a position I1. The position I1 is a position within an area AR1 away from the vehicle 2 by a distance over 5 m and equal to or less than the maximum communicable distance. The distance over 5 m and equal to or less than the maximum communicable distance corresponds to an example of "fourth distance" of the present invention.

When the operator Uz is at the position I1, the lighting control unit 2130 of the vehicle control apparatus 200 determines as negative in step S101 so that all the lights of the vehicle 2 are in a lit-off state.

It is assumed that the operator Uz moves from the position I1 toward the left side and stands at a position I2. The position I2 is a position within an area AR2 away from the vehicle 2 by a distance over 3 m and equal to or less than 5 m. The distance over 3 m and equal to or less than 5 m corresponds to an example of "first distance" of the present invention.

When the operator Uz is at the position I2, the lighting control unit 2130 determines as negative in step S104 so that the room lights 27 are turned on. Thereby, the car cabin 2A is illuminated by the room lights 27, so that the operator Uz can check the condition of the car cabin 2A of the vehicle 2 the operator Uz is about to ride at the position away from the vehicle 2 by a distance over 3 m and equal to or less than 5 m.

It is assumed that the operator Uz moves from the position I2 toward the left side and stands at a position I3. The position I3 is a position within an area AR3 away from the vehicle 2 by a distance over 1 m and equal to or less than 3 m. The distance over 1 m and equal to or less than 3 m corresponds to an example of "second distance" of the present invention.

When the operator Uz is at the position I3, the lighting control unit 2130 determines as negative in step S107 so that the under lights 28 are turned on in addition to the room lights 27. Thereby, the ground in the vicinity of the door 25 is illuminated by the under lights 28, so that the operator Uz can check the condition of the ground in the vicinity of the door 25 of the vehicle 2 the operator Uz is about to ride at the position away from the vehicle 2 by a distance over 1 m and equal to less than 3 m. That is, the operator Uz can check the ground condition in the vicinity of the door 25 by approaching the vehicle 2 still closer from the position I2. Then, the operator Uz can smoothly ride in the vehicle 2. Further, because the room lights 27 are also on, the operator Uz can check the condition of the car cabin 2A as well.

It is assumed that the operator Uz moves from the position I3 toward the left side and stands at a position I4. The position I4 is a position within an area AR4 away from the vehicle 2 by a distance equal to or less than 1 m. The distance equal to or less than 1 m from the vehicle 2 corresponds to an example of "third distance" of the present invention.

When the operator Uz is at the position I4, the lighting control unit 2130 determines as positive in step S107 so that the guide lights 32 are turned on in addition to the room lights 27 and the under lights 28. Thereby, by approaching the vehicle 2 still closer from the position I3, the operator Uz can check what part of the door 25 the door lock sensor 26 for doing an unlocking operation is provided. Further, because the under lights 28 are on, the operator Uz can check the ground condition in the vicinity of the door 25 of the vehicle 2 the operator Uz is about to ride. Therefore, the operator Uz can smoothly ride in the vehicle 2. Further, because the room lights 27 are also on, the operator Uz can check the condition of the car cabin 2A as well.

When the operator Uz moves away from the vehicle 2, the lighting control unit 2130 turns off the corresponding lights according to the vehicle-terminal distance. For example, it is assumed in FIG. 4 that the operator Uz moves from the position I4 to the position I1 without doing an unlocking operation of the vehicle 2. In such case, the lighting control unit 2130 turns off the guide lights 32, the under lights 28, and the room lights 27 in this order according to the vehicle-terminal distance.

1-4. Summary of First Embodiment

As described above, the vehicle control apparatus 200 includes: the distance acquiring unit 2120 that acquires the vehicle-terminal distance between the vehicle 2 and the mobile terminal 3 that has the unlocking function of the vehicle 2 as a mode of the mobile body; and the lighting control unit 2130 that controls the lit state of the room lights 27 and the under lights 28 that are provided to the vehicle 2 according to the vehicle-terminal distance acquired by the distance acquiring unit 2120.

Further, the lighting control method executed by the vehicle control apparatus 200 acquires the vehicle-terminal distance between the vehicle 2 and the mobile terminal 3 that has the unlocking function of the vehicle 2, and controls the lit state of the room lights 27 and the under lights 28 that are provided to the vehicle 2 according to the acquired vehicle-terminal distance.

With the vehicle control apparatus 200 and the lighting control method, it is possible to control the lit state of the two kinds of lights that are the room lights 27 and the under lights 28 according to the vehicle-terminal distance. Therefore, when using the vehicle 2, the operator Uz of the mobile terminal 3 can check the condition of the car cabin 2A and the ground condition in the vicinity of the door 25.

Further, the lighting control unit 2130 turns on the room lights 27 when the vehicle-terminal distance acquired by the distance acquiring unit 2120 is the distance over 3 m and equal to or less than 5 m, and turns on the under lights 28 when the vehicle-terminal distance acquired by the distance acquiring unit 2120 is the distance over 1 m and equal to or less than 3 m.

With this, when using the vehicle 2, the operator Uz of the mobile terminal 3 can check the condition of the car cabin 2A at a position farther from the vehicle 2 than the position where the ground condition in the vicinity of the door 25 can be checked. Therefore, the operator Uz can first check the condition of the car cabin 2A when using the vehicle 2. For enabling the operator Uz to first check the condition of the car cabin 2A is effective especially when the vehicle 2 the operator Uz is about to use is the vehicle rented via a rental car service, a car sharing service, or the like. With the vehicle 2 rented via a rental car service, a car sharing service, or the like, there may be a circumstance where the previous user is still riding inside when the operator Uz is about to use the vehicle 2. That is, with the vehicle 2 rented via a rental car service, a car sharing service, or the like, it is possible that an unacquainted user is still in use when the operator Uz is about to use the vehicle 2. Therefore, by making it possible to check the condition of the car cabin 2A of such vehicle 2 at a position away from the vehicle 2, the operator Uz can check whether or not it is possible to safely use the vehicle at the position away from the vehicle 2. As described above, the lighting control unit 2130 first turns on the room lights 27, so that the operator Uz can first check the condition of the car cabin 2A at a position away from the vehicle 2 when using the vehicle 2. Therefore, with the vehicle control apparatus 200, the operator Uz can safely use the vehicle 2 even when the vehicle 2 is rented via a rental car service, a car sharing service, or the like.

The lighting control unit 2130 is capable of controlling the lit state of the guide lights 32 for guiding the positions of the door lock sensors by being lit on, and turns on the guide lights 32 when the vehicle-terminal distance acquired by the distance acquiring unit 2120 is equal to or less than 1 m.

This makes it possible for the operator Uz of the mobile terminal 3 to check the position of the door lock sensor 26 when using the vehicle 2.

Further, the under lights 28 illuminate the position where the passengers of the vehicle 2 get in and out the vehicle 2.

This makes it possible for the operator Uz to smoothly get in and out of the vehicle 2 even at night or even when the surrounding of the vehicle 2 is dark.

2. Second Embodiment

Figure 5:
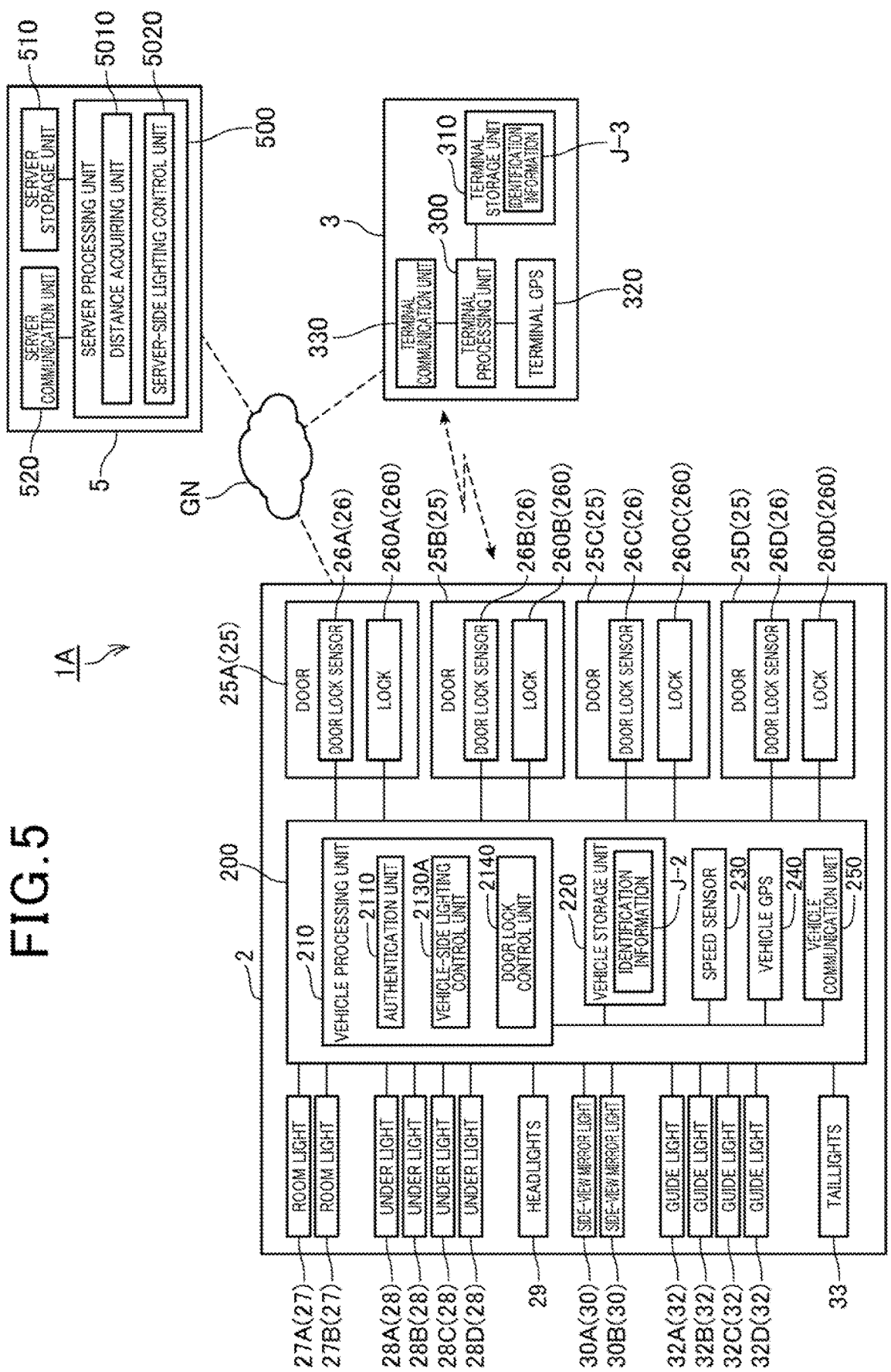
FIG. 5 is a block diagram showing a configuration of a vehicle control system according to a second embodiment.

FIG. 5 is a diagram showing a vehicle control system 1A of the second embodiment.

In the explanation of the second embodiment, same reference signs are applied to the structural elements same as those of the vehicle control system 1 of the first embodiment and details thereof are omitted.

As is clear from a comparison with FIG. 1, the vehicle control system 1A of the second embodiment includes a lighting control server 5 that is connected to a global network GN. In the second embodiment, the lighting control server 5 corresponds to an example of the lighting control apparatus of the present invention. Further, in the vehicle control system 1A of the second embodiment, the mobile terminal 3 and the vehicle 2 are connected to the global network GN and capable of communicating with the lighting control server 5 via the global network GN.

As shown in FIG. 5, the lighting control server 5 includes a server processing unit 500, a server storage unit 510, and a server communication unit 520 (server receiver/transmitter).

The server processing unit 500 is a computer that includes a processor such as a CPU, for example. The server storage unit 510 is connected to the server processing unit 500. The server storage unit 510 stores a control program that is a computer program executed by the server processing unit 500 and various kinds of data processed by the server processing unit 500 in a manner to be readable by the server processing unit 500.

Like the case of the terminal processing unit 300 and the terminal storage unit 310, there is no specific limit set for the mode of hardware configuring the server processing unit 500 and the server storage unit 510.

The server processing unit 500 controls each unit of the lighting control server 5 based on the data stored in the server storage unit 510 by executing the programs stored in the server storage unit 510. The server processing unit 500 includes a distance acquiring unit 5010 and a server-side lighting control unit 5020 as functional elements or functional units. Those functional elements are achieved by executing the control program stored in the server storage unit 510 by the server processing unit 500 that is the computer. In the second embodiment, the server-side lighting control unit 5020 corresponds to an example of the lighting control unit of the present invention.

The server communication unit 520 wirelessly communicates with external devices connected to the global network GN by executing wireless communication conforming to the communication standard such as the mobile phone network, Wi-Fi, or the like according to the control of the server processing unit 500.

As is clear from a comparison with FIG. 2, the vehicle processing unit 210 of the vehicle 2 does not include a distance acquiring unit but includes a vehicle-side lighting control unit 2130A instead of the lighting control unit 2130 as a functional element or a functional unit. Further, the vehicle communication unit 250 of the second embodiment is capable of communicating with external devices connected to the global network GN. The vehicle-side lighting control unit 2130A controls the lit state of various kinds of lights provided to the vehicle 2 like the lighting control unit 2130 of the first embodiment but does not execute actions shown in FIG. 3.

Actions of the vehicle control system 1A of the second embodiment will be described.

When the authentication unit 2110 determines that communication between the vehicle 2 and the mobile terminal 3 is established, the authentication unit 2110 transmits the determination result to the lighting control server 5 via the vehicle communication unit 250.

The lighting control server 5 receives the determination result from the vehicle 2 via the server communication unit 520, the distance acquiring unit 5010 of the server processing unit 500 acquires the vehicle-terminal distance at prescribed intervals like the distance acquiring unit 2120 of the first embodiment. For example, the distance acquiring unit 5010 acquires the vehicle-terminal distance by receiving the distance calculated by the mobile terminal 3 in the method described above via the server communication unit 520. Further, for example, the distance acquiring unit 5010 acquires the vehicle-distance by receiving the terminal position data calculated by the terminal GPS 320 and the vehicle position data calculated by the vehicle GPS 240 and conducting a calculation based on the received position data.

Then, the server-side lighting control unit 5020 executes the actions similar to those shown in the flowchart of FIG. 3 and, when the vehicle-terminal distance acquired by the distance acquiring unit 5010 is the distance over 3 m and equal to or less than 5 m, transmits a light-up instruction signal for turning on the room lights 27 to the vehicle 2 via the server communication unit 520. Further, the server-side lighting control unit 5020 executes the actions similar to those shown in the flowchart of FIG. 3 and, when the vehicle-terminal distance acquired by the distance acquiring unit 5010 is the distance over 1 m and equal to or less than 3 m, transmits a light-up instruction signal for turning on the under lights 28 to the vehicle 2 via the server communication unit 520. Further, the server-side lighting control unit 5020 executes the actions similar to those shown in the flowchart of FIG. 3 and, when the vehicle-terminal distance acquired by the distance acquiring unit 5010 is the distance equal to or less than 1 m, transmits a light-up instruction signal for turning on the guide lights 32 to the vehicle 2 via the server communication unit 520.

When the vehicle communication unit 250 of the vehicle control apparatus 200 receives the light-up instruction signal, the vehicle-side lighting control unit 2130A turns on the lights indicated by the light-up instruction signal according to the light-up instruction signal. Thereby, the second embodiment can achieve the same effect as that of the first embodiment.

3. Modification Example

In the configurations of the first embodiment and the second embodiment, the lighting control unit 2130 and the server-side lighting control unit 5020 may be configured to turn on the headlights 29, the side-view mirror lights 30A, 30B, and the taillights 33 when the vehicle-terminal distance is over 5 m and equal to or less than the maximum communicable distance. With such configuration, the operator Uz can easily check which one is the vehicle 2 to be used at a position away from the vehicle 2. In this configuration, the lighting control unit 2130 and the server-side lighting control unit 5020 may turn on only the light corresponding to the direction where the operator Uz is positioned with respect to the vehicle 2. For example, in a case of FIG. 4, the lighting control unit 2130 and the server-side lighting control unit 5020 determine that the operator Uz is located on the right side of the vehicle 2 based on the position data of the vehicle GPS 240 and the terminal GPS 320. Then, when the vehicle-terminal distance is the distance over 5 m and equal to or less than the maximum communicable distance, the lighting control unit 2130 and the server-side lighting control unit 5020 turn on the side-view mirror light 30A.

As described, the lighting control unit 2130 and the server-side lighting control unit 5020 are capable of controlling the lit states of the headlights 29, the side-view mirror lights 30A, 30B, and the taillights 33. When the vehicle-terminal distance is the distance over 5 m and equal to or less than the maximum communicable distance, the lighting control unit 2130 and the server-side lighting control unit 5020 turn on at least one out of the headlights 29, the side-view mirror lights 30A, 30B, and the taillights 33.

This makes it possible for the operator Uz to easily check which one is the vehicle 2 to be used at a position away from the vehicle 2.

4. Other Embodiments

Note that the present invention is not limited to the configurations of each of the embodiments and the modification example described above but various modes can be employed without departing from the spirit and scope thereof.

For example, the vehicle 2 may be a manually drivable vehicle that runs by operations related to driving done by a driver or may be an automatically driven vehicle that automatically runs without operations related to driving done by a driver. Further, the vehicle 2 is a vehicle such as an engine-driven four-wheeled vehicle, a motor-driven electric vehicle, or a hybrid vehicle equipped with a motor and an engine, for example. Note that the vehicle 2 may also be a vehicle other than a four-wheeled vehicle.

Further, while the mobile body of the present invention is the vehicle 2 in each of the embodiments and the modification example described above, for example, the mobile body may be any kinds of mobile body on which a drive source is loaded for driving the mobile body by steering operations of the driver.

Further, for example, the distance over 3 m and equal to or less than 5 m is presented as the first distance of the present invention, the distance over 1 m and equal to or less than 3 m is presented as the second distance of the present invention, the distance equal to or less than 1 m is presented as the third distance of the present invention, and the distance over 5 m and equal to or less than the maximum communicable distance is presented as the fourth distance of the present invention in each of the embodiment and the modification example described above. However, the first distance, the second distance, the third distance, and the fourth distance are not limited to those distances. Each of the first distance, the second distance, the third distance, and the fourth distance may be any distance that is equal to or less than the maximum communicable distance and gets shorter in order of the fourth distance, the first distance, the second distance, and the third distance.

Further, for example, the under lights 28 are presented as the second lighting unit of the present invention in each of the embodiment and the modification example described above. However, the second lighting unit may be any lights that illuminate the ground in the vicinity of the doors 25, so that the second lighting unit may also be the side-view mirror lights 30 if the side-view mirror lights 30 can illuminate the ground, for example.

Further, while each of the embodiments and the modification example described above is configured such that the number of lights to be turned on is increased as the vehicle-terminal distance gets shorter, for example, it is also possible to employ a configuration in which the lights to be turned on are changed as the vehicle-terminal distance gets shorter.

Further, in the above embodiments, for example, the block diagrams shown in FIG. 2 and FIG. 5 are schematic views in which the structural elements are classified according to the main processing contents thereof for making it easier to understand the present invention, and may also be classified into still greater number of structural elements according to the processing contents. Further, a single structural element can also be classified to execute still greater kinds of processing.

Further, the step units of the actions shown in FIG. 3, for example, are divided according to the main processing contents thereof for making it easier to understand the actions of the lighting control apparatus, and the present invention is not limited by the way how the processing units are divided or by the names thereof. It is also possible to divide the step units into still greater number of units according to the processing contents. Further, a single step unit may be divided to include still greater kinds of processing. Further, the order of the steps may be changed as appropriate within the scope not departing from the spirit of the present invention.

REFERENCE SIGNS LIST

1, 1A Vehicle control system
2 Vehicle (mobile body)
2A Car cabin (inside of mobile body)
3 Mobile terminal (communication terminal)
5 Lighting control server (lighting control apparatus)
26, 26A, 26B, 26C, 26D Door lock sensor (receiving unit)
27, 27A, 27B Room light (first lighting unit)
28, 28A, 28B, 28C, 28D Under light (second lighting unit)
29 Headlights (fourth lighting unit)
30, 30A, 30B Side-view mirror light (fourth lighting unit)
32, 32A, 32B, 32C, 32D Guide light (third lighting unit)
33 Taillights (fourth lighting unit)
200 Vehicle control apparatus (lighting control apparatus)
210 Vehicle processing unit
220 Vehicle storage unit
230 Speed sensor
240 Vehicle GPS
250 Vehicle communication unit
260, 260A, 260B, 260C, 260D Lock
300 Terminal processing unit
310 Terminal storage unit
320 Terminal GPS
330 Terminal communication unit
2110 Authentication unit
2120, 5010 Distance acquiring unit
2130 Lighting control unit
2140 Door lock control unit
5020 Server-side lighting control unit (lighting control unit)

What is claimed is:

1. A lighting control apparatus, comprising a processor configured to:
    acquire a distance between a mobile body and a communication terminal, the communication terminal giving an instruction to unlock the mobile body; and
    control lit states of a first light and a second light that are provided to the mobile body according to the acquired distance, wherein
    the first light illuminates an inside of the mobile body by being lit on,
    the second light illuminates an outside of the mobile body by being lit on, and
    the processor turns on the first light when the acquired distance is a first distance, and turns on the second light when the acquired distance is a second distance that is shorter than the first distance.

2. The lighting control apparatus according to claim 1, wherein, when the acquired distance is a third distance that is shorter than the second distance, the processor turns on a third light provided to the mobile body that guides a user to a position of a switch or a touch sensor for receiving an unlocking operation of the mobile body by being lit on.

3. The lighting control apparatus according to claim 1, wherein the second light illuminates a position where a passenger of the mobile body gets in and out of the mobile body.

4. The lighting control apparatus according to claim 3, wherein, when the acquired distance is a fourth distance that is longer than the first distance, the processor turns on a fourth light that illuminates the outside of the mobile body, the fourth light being at least one of a mobile body headlight, a mobile body taillight, and a mobile body side-view mirror light.

5. A lighting control method of a lighting control apparatus that controls lit states of a first light and a second light that are provided to a mobile body, the method comprising, by the lighting control apparatus comprising a processor:

acquiring, using the processor of the lighting control apparatus, a distance between the mobile body and a communication terminal, the communication terminal giving an instruction to unlock the mobile body; and controlling, using the processor of the lighting control apparatus, the lit states of the first light and the second light according to the acquired distance, wherein the first light illuminates an inside of the mobile body by being lit on, the second light illuminates an outside of the mobile body by being lit on, and controlling the lit states of the first light and the second light according to the acquired distance comprises:

turning on the first light when the acquired distance is a first distance, and turning on the second light when the acquired distance is a second distance that is shorter than the first distance.

* * * * *